(12) United States Patent
Zhou

(10) Patent No.: US 9,373,975 B2
(45) Date of Patent: Jun. 21, 2016

(54) ELECTRONIC DEVICE, ELECTRONIC SYSTEM AND WIRELESS CHARGING METHOD

(71) Applicant: LENOVO (BEIJING) LIMITED, Beijing (CN)

(72) Inventor: Zhiqiang Zhou, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 215 days.

(21) Appl. No.: 14/221,426

(22) Filed: Mar. 21, 2014

(65) Prior Publication Data

US 2015/0091509 A1 Apr. 2, 2015

(30) Foreign Application Priority Data

Sep. 27, 2013 (CN) .......................... 2013 1 0453041

(51) Int. Cl.
*H02J 7/02* (2016.01)
*H02J 7/00* (2006.01)
*G06F 1/16* (2006.01)
*G06F 1/26* (2006.01)

(52) U.S. Cl.
CPC ................ *H02J 7/025* (2013.01); *G06F 1/1656* (2013.01); *G06F 1/26* (2013.01); *H02J 7/0042* (2013.01)

(58) Field of Classification Search
CPC ....... H02J 5/005; H02J 7/0025; H02J 7/0042; G06F 1/1656
USPC .......................................................... 320/108
See application file for complete search history.

(56) References Cited

U.S. PATENT DOCUMENTS

| 7,164,255 | B2 * | 1/2007 | Hui ..................... H01F 17/0006 320/108 |
| 7,791,312 | B2 * | 9/2010 | Kook .................... H02J 7/0044 320/108 |
| 7,868,585 | B2 * | 1/2011 | Sarnowsky ........... H02J 7/0042 191/10 |
| 7,936,147 | B2 * | 5/2011 | Kook .................... H02J 7/0044 320/108 |
| 8,067,921 | B2 * | 11/2011 | Sip ...................... B60L 11/1829 320/108 |
| 8,432,129 | B2 * | 4/2013 | Lee ........................ H02J 7/025 320/108 |
| 8,666,459 | B2 * | 3/2014 | Matsui .................. H01Q 1/243 320/108 |
| 8,716,974 | B2 * | 5/2014 | Sakoda ................ B60L 11/182 307/104 |
| 8,890,470 | B2 * | 11/2014 | Partovi .................. H01F 7/0252 320/108 |
| 9,177,717 | B2 * | 11/2015 | Yang ........................ H01F 5/00 |
| 2012/0139484 | A1 * | 6/2012 | Gunderman ............ H02J 7/025 320/108 |
| 2013/0271073 | A1 * | 10/2013 | Yang ........................ H01F 5/00 320/108 |
| 2014/0217969 | A1 * | 8/2014 | Murakami .............. H02J 5/005 320/108 |

* cited by examiner

*Primary Examiner* — Sun Lin
(74) *Attorney, Agent, or Firm* — Scully Scott Murphy & Presser

(57) ABSTRACT

An electronic device, an electronic system, and a wireless charging method are provided. The electronic device has a housing, which has an operating surface on which a display unit or an input device is provided and a first end surface adjoining the operating surface at a first edge. The operating surface has an area greater than that of the first end surface. The electronic device also has a coil for electromagnetic induction. The coil is provided in a first side portion of the housing close to the first end surface, and formed in a columnar shape with an axis substantially parallel to the first edge.

15 Claims, 7 Drawing Sheets

ELECTRONIC DEVICE, ELECTRONIC SYSTEM AND WIRELESS CHARGING METHOD

TECHNICAL FIELD

The present disclosure generally relates to the electronics field, and particularly, to an electronic device, an electronic system, and a wireless charging method.

BACKGROUND

As the technology develops, an era of rapid development for electronic products comes, and various new electronic products, such as smart phones, tablet computers, notebook computers, smart TVs, etc., emerge in the market. These electronic devices cause great conveniences to our daily life.

The electronic devices should be charged frequently for continuous usage. Recently, it is a main trend to charge the electronic devices in a wireless manner. Existing wireless charging technologies are based on the Maxwell theories.

For a tablet electronic product, for example, an existing wireless charging technique is to charge the tablet electronic product by a charging pad.

Specifically, a flat coil for electromagnetic induction is provided inside the tablet electronic device, with an axis perpendicular to a front surface of the tablet electronic device on which a display panel is disposed. The flat coil for electromagnetic induction is in tight contact with the front surface or a back surface opposite to the front surface.

Also, a flat coil for electromagnetic induction is provided inside the charging pad, with an axis perpendicular to a charging surface of the charging pad. The flat coil for electromagnetic induction is in tight contact with the charging surface.

If the tablet electronic device needs to be charged, we can put it onto the charging pad, with its front or back surface against the charging surface of the charging pad. Then, the tablet electronic device can be charged.

However, the inventors found that there are some disadvantages in the wireless charging technologies.

For example, in a case where the tablet electronic device is to be charged by the flat coil for electromagnetic induction in tight contact with the front or back surface thereof, it is necessary to lay the front or back surface of the tablet electronic device against the charging pad to achieve wireless charging.

In other words, the tablet electronic device can be charged in a wireless manner only if its front or back surface is lying against the charging pad.

SUMMARY

The present disclosure aims to provide, among others, an electronic device, to eliminate the need of putting a tablet electronic device with its front or back surface against a charging pad to achieve wireless charging of the electronic device.

According to an aspect, there is provided an electronic device, comprising: a housing, including an operating surface on which a display unit or an input device is provided and a first end surface adjoining the operating surface at a first edge, wherein the operating surface has an area greater than that of the first end surface; and a coil for electromagnetic induction, provided in a first side portion of the housing close to the first end surface, and formed in a columnar shape with an axis substantially parallel to the first edge.

The area of the operating surface may be greater than or equal to an area of any surface of the housing other than the operating surface.

The coil for electromagnetic induction may comprise a columnar core and a winding wound around a side surface of the core, wherein the winding is wound for at least 2 turns in a direction of the axis.

The operating surface may comprise a surface on which the display unit is provided. In this case, the electronic device may further comprise an energy storage unit provided in the housing, wherein the coil for electromagnetic induction is configured to induce and output a supply voltage under a varying magnetic field to charge the energy storage unit.

The electronic device may further comprise a regulator circuit connected between the coil for electromagnetic induction and the energy storage unit and configured to regulate the supply voltage from the coil for electromagnetic induction to output a regulated voltage to charge the energy storage unit.

The electronic device may further comprise a first attaching mechanism provided on a surface of the first side portion and configured to detachably attach the electronic device to a mating device for use with the electronic device in such a manner that the electronic device is rotatable with respect to the mating device.

The operating surface may comprise a surface on which the input device is provided. In this case, the electronic device may further comprise an alternating power supply connected to the coil for electromagnetic induction, wherein the alternating power supply is configured to supply an alternating current to the coil for electromagnetic induction so that the coil for electromagnetic induction induces and generates a varying magnetic field.

The coil for electromagnetic induction may be provided on a side of the first side portion close to the operating surface.

The electronic device may further comprise a second attaching mechanism provided on a portion of the operating surface in the first side portion at a distance from the coil for electromagnetic induction less than a first preset value and configured to detachably attach the electronic device to a mating device for use with the electronic device in such a manner that the electronic device is rotatable with respect to the mating device.

According to a further aspect of the present disclosure, there is provided an electronic system, comprising a first body and a second body, and further comprising: a first attaching mechanism provided on the first body; and a second attaching mechanism provided on the second body, wherein the first attaching mechanism and the second attaching mechanism are configured to detachably attach the first body to the second body in such a manner that the first body is rotatable with respect to the second body and that a first coil for electromagnetic induction included in the first body has a first axis substantially parallel to a second axis of a second coil for electromagnetic induction included in the second body.

The second body may further comprise a positioning mechanism connected to the second attaching mechanism, wherein the positioning mechanism is configured to output a connection signal when the first body is attached to the second body so that an alternating power supply included in the second body supplies power to the second coil based on the connection signal, and to output a disconnection signal when the first body is detached from the second body so that the alternating power supply stops supplying power to the second coil based on the disconnection signal.

The second attaching mechanism may comprise a receiving groove and the first attaching mechanism may comprise a holding end receivable in the receiving groove, wherein the first body and the second body have at least a first relative position and a second relative position different from the first relative position with respect to each other when the holding end is received in the receiving groove.

A distance between the second coil and the receiving groove may be less than a second preset value and the first coil may be provided inside the holding end, so that a distance between the first coil and the second coil is less than a third preset value when the holding end is received in the receiving groove.

The electronic system may further comprise: a first communication unit provided in the first body at a distance from the first positioning mechanism less than a fourth preset value; and a second communication unit provided in the second body at a distance from the second positioning mechanism less than a fifth preset value, wherein the first communication unit and the second communication are configured to transmit and receive data therebetween for wireless data communication between the first body and the second body.

According to a still further aspect of the present disclosure, there is provided a wireless charging method for an electronic system as above, the method comprising: supplying an alternating current by an alternating power supply in the second body to the second coil; generating a varying magnetic field by the second coil based on the alternating current; and inducing and outputting a supply voltage by the first coil based on the varying magnetic field in a state where the first body is attached to the second body, to charge an energy storage unit included in the first body.

According to embodiments of the present disclosure, there can be various effects or advantages.

The coil for electromagnetic induction can be provided in the first side portion of the housing close to the first end surface, which is not a surface of the housing with a maximal area. In other words, the coil for electromagnetic induction can be provided in the side portion of the electronic device close to the end surface with a relatively small area. As a result, if only the first side portion of the electronic device close to the end surface with a relatively small area is put into a varying magnetic field, the coil for electromagnetic induction in the first side portion can induce a supply voltage. Therefore, it is possible to eliminate the need of putting a tablet electronic device with its front or back surface against a charging pad to achieve wireless charging of the electronic device, and to provide a novel electronic device which can be charged in a wireless manner if only a first side portion thereof, close to an end surface with a relatively small area, is put into a varying magnetic field.

The coil for electromagnetic induction may comprise a columnar core and a winding wound around a side surface of the core. The winding may be wound for at least 2 turns in an axial direction. It is possible to reduce the cross section of the coil in its maximal area while ensuring a total number of turns of the winding by increasing the number of turns of the winding wound in the axial direction. As a result, even if the electronic device is an ultra-thin device, the coil can provided in the electronic device in such a manner that its axis is substantially parallel to the operating surface.

In a state where the first body is detachably attached to the second body by the first attaching mechanism and the second attaching mechanism, the axis of the first coil in the first body may be substantially parallel to the axis of the second coil in the second body, so that the first coil can capture magnetic flux at a relatively great varying rate to induce a relatively great supply voltage based on the varying magnetic field.

By providing the positioning mechanism connected to the second attaching mechanism in the second body, the alternating power supply can supply power to the second coil in the second body only if the first body is attached to the second body. As a result, it is possible to save energy.

DETAILED DESCRIPTION

According to aspects of the present disclosure, there are provided an electronic device, an electronic system, and a wireless charging method, to eliminate the need of putting a tablet electronic device with its front or back surface against a charging pad to achieve wireless charging of the electronic device. According to embodiments of the present disclosure, there is provided a novel electronic device which can be charged in a wireless manner if only a first side portion thereof, close to an end surface with a relatively small area, is put into a varying magnetic field.

According to an aspect of the present disclosure, there is provided an electronic device, comprising: a housing, including an operating surface on which a display unit or an input device is provided and a first end surface adjoining the operating surface at a first edge, wherein the operating surface has an area greater than that of the first end surface; and a coil for electromagnetic induction, provided in a first side portion of the housing close to the first end surface, and formed in a columnar shape with an axis substantially parallel to the first edge.

The coil for electromagnetic induction can be provided in the first side portion of the housing close to the first end surface, which is not a surface of the housing with a maximal area. In other words, the coil for electromagnetic induction can be provided in the side portion of the electronic device close to the end surface with a relatively small area. As a result, if only the first side portion of the electronic device close to the end surface with a relatively small area is put into a varying magnetic field, the coil for electromagnetic induction in the first side portion can induce a supply voltage. Therefore, it is possible to eliminate the need of putting a tablet electronic device with its front or back surface against a charging pad to achieve wireless charging of the electronic device, and to provide a novel electronic device which can be charged in a wireless manner if only a first side portion thereof, close to an end surface with a relatively small area, is put into a varying magnetic field.

To better understand the technology disclosed herein, embodiments of the present disclosure will be described in detail with reference to the attached drawings. It is to be understood that the embodiments are provided for illustration only, and are not intended to limit the present disclosure. The mere fact that different embodiments and various features in the embodiments are described separately does not necessarily mean that these embodiments and/or these features cannot be combined to advantage.

Embodiment 1

According to an embodiment of the present disclosure, there is provided an electronic device. The electronic device may comprise, but not limited to, a tablet computer, a smart phone, a charging pad, a seat for use with a tablet computer, or the like.

Figure 1:
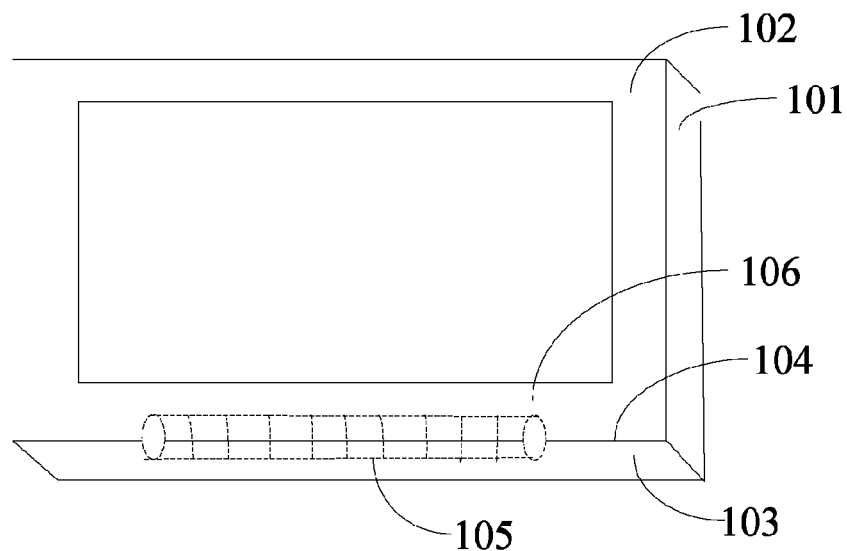
FIG. 1 is a schematic view showing a configuration of an electronic device according to an embodiment of the present disclosure.

FIG. 1 is a schematic view showing a configuration of an electronic device according to an embodiment of the present disclosure.

Referring to FIG. 1, the electronic device may comprise a housing 101. The housing 101 may include an operating surface 102 on which a display unit or an input device is provided and a first end surface 103 adjoining the operating surface 102 at a first edge 104. The operating surface 102 may have an area greater than that of the first end surface 103.

The electronic device may further comprise a coil 105 for electromagnetic induction provided in a first side portion 106 of the housing 101 close to the first end surface 103. The coil 105 may be formed in a columnar shape, with an axis substantially parallel to the first edge 104.

According to an embodiment, the area of the operating surface 102 may be greater than or equal to an area of any surface of the housing other than the operating surface. The operating surface 102 may have the display unit or the input device provided thereon. In other words, in a case where the electronic device is a tablet computer or a smart phone, the operating surface 102 may comprise a front surface on which the display unit is provided; and in a case where the electronic device is a seat for use with a tablet computer, the operating surface 102 may comprise a front surface on which a keyboard or a touch pad is provided.

Hereinafter, the coil 105, where to provide and how to connect the coil 105 in the electronic device, and how to attach the electronic device to charge it will be described in detail.

Firstly, the coil 105 will be explained.

Figure 2:
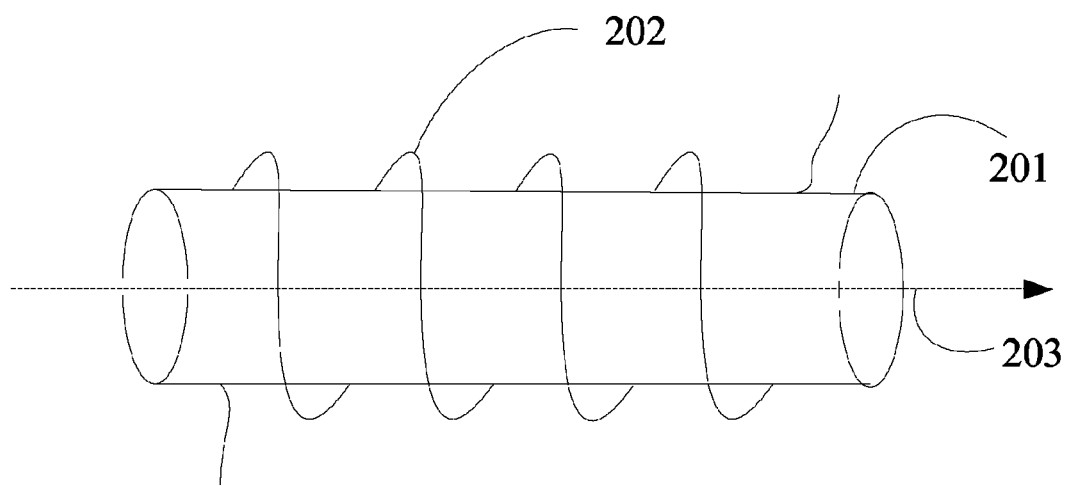
FIG. 2 is a schematic view showing a configuration of a coil for electromagnetic induction according to an embodiment of the present disclosure.

FIG. 2 is a schematic view showing a configuration of a coil for electromagnetic induction according to an embodiment of the present disclosure.

Referring to FIG. 2, the coil 105 may comprise a columnar core 201 and a winding 202 wound around a side surface of the core. The winding 202 may be wound for at least 2 turns in a direction 203 of the axis.

The columnar core 201 may have a cross section in circle, ellipse, polygon, or any other shape. The core 201 may comprise a magnetic conductor.

The winding 203 may be wound for at least 2 turns in the axial direction 203. It is possible to reduce the cross section of the coil 105 in its maximal area while ensuring a total number of turns of the winding by increasing the number of turns of the winding 202 wound in the axial direction 203. As a result, even if the electronic device is an ultra-thin device, the coil 105 can provided in the electronic device in such a manner that its axis is substantially parallel to the operating surface 102.

Next, where to provide and how to connect the coil 105 in the electronic device will be explained.

Descriptions will be given with respect to a case where the electronic device is a tablet computer or a smart phone and a case where the electronic device is a seat for use with electronic devices such as tablet computers and smart phones, respectively. However, it is to be noted that the electronic device is not limited to these two cases.

In the case where the electronic device is a tablet computer or a smart phone, the operating surface 102 may comprise a front surface on which the display unit is provided, and the first end surface 103 may comprise any elongate side surface adjoining the front surface. Any one of four edges of the operating surface 102 may constitute the first edge 104.

Figure 3A:
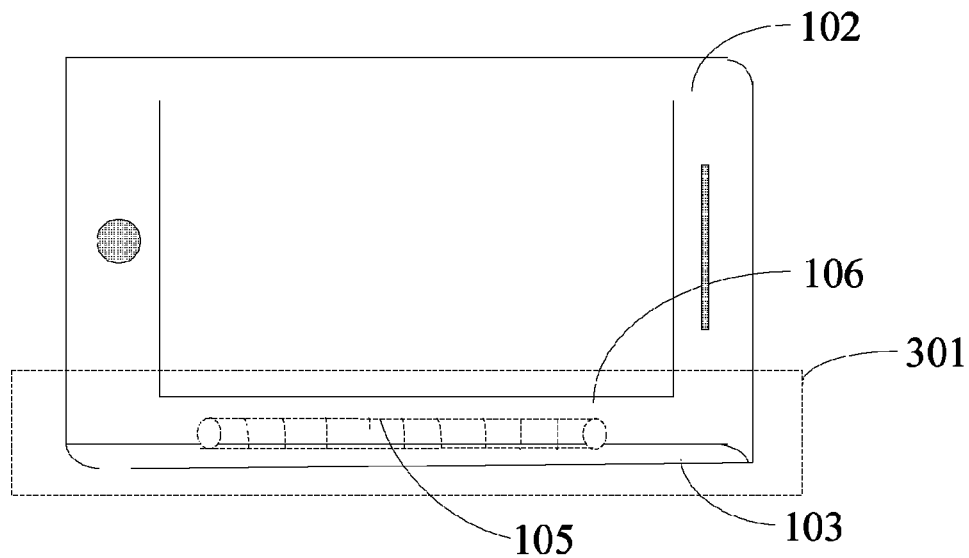
FIG. 3A is a schematic view showing a case where a coil for electromagnetic induction is disposed close to a first end surface with a relatively great surface.
Figure 3B:
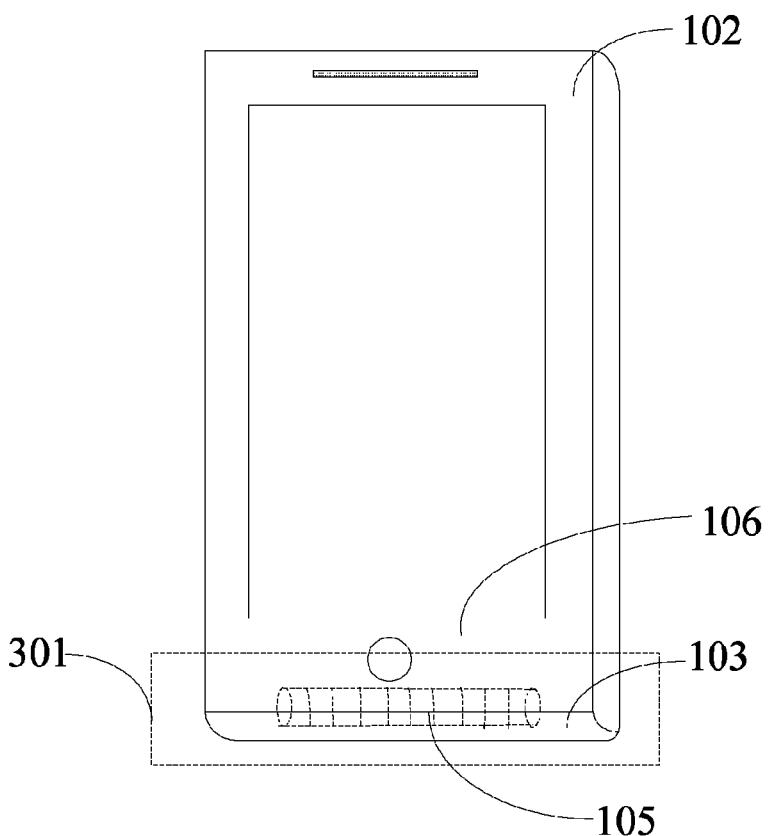
FIG. 3B is a schematic view showing a case where a coil for electromagnetic induction is disposed close to a first end surface with a relatively small surface.

The coil 105 may be provided in the electronic device as shown in FIGS. 3A-3B. FIG. 3A is a schematic view showing a case where the coil is disposed close to a first end surface with a relatively great surface, and FIG. 3B is a schematic view showing a case where the coil 105 is disposed close to a first end surface with a relatively small surface.

As shown in FIGS. 3A-3B, it is possible for the coil 105 to induce and output a supply voltage if only the first side portion 106 of the electronic device close to the first side surface 103 is put into a varying magnetic field 301, without need of putting the operating surface 102 of the electronic device or a back surface opposite to the operating surface 102 entirely against a charging pad.

Figure 4:
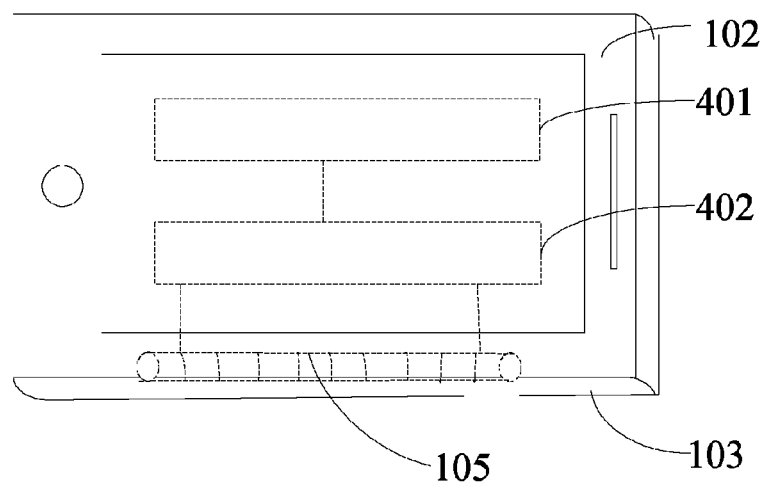
FIG. 4 is a schematic view showing connections of a coil for electromagnetic induction in an electronic device according to an embodiment of the present disclosure.

Further reference may be made to FIG. 4. FIG. 4 is a schematic view showing connections of the coil in the electronic device according to an embodiment of the present disclosure. If the operating surface 102 is a front surface on which the display unit is provided, the electronic device may further comprise an energy storage unit 401 provided in the housing 101 so that the supply voltage induced by the coil 105 can be stored for long-term use of the electronic device, as shown in FIG. 4. The coil 105 may induce and output the supply voltage under a varying magnetic field to charge the energy storage unit 401.

Still referring to FIG. 4, in order to prevent fluctuations of the supply voltage generated by the coil 105 from damaging the energy storage unit 401, the electronic device may further comprise a regulator circuit 402 connected between the coil 105 and the energy storage unit 401 and configured to regulate the supply voltage from the coil 105 to output a regulated voltage to charge the energy storage unit 401.

In the case where the electronic device is a seat for use with electronic devices such as tablet computers and smart phones, the operating surface 102 may comprise a front surface on which a keyboard or a touch pad is provided, and the first end surface 103 may comprise any elongate side surface adjoining the front surface. Any one of four edges of the operating surface 102 may constitute the first edge 104.

Figure 5:
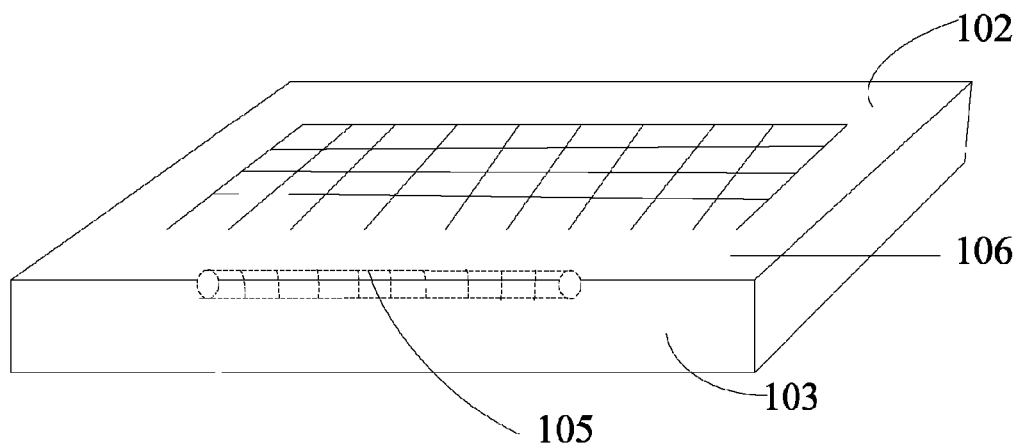
FIG. 5 is a schematic view showing a case where a coil for electromagnetic induction is provided in a seat.

The coil 105 may be provided in the electronic device as shown in FIG. 5. Specifically, FIG. 5 is a schematic view showing a case where the coil is provided in the seat.

According to an embodiment of the present disclosure, if it is desirable for a tablet computer or a smart phone to be detachably attached to the seat for wireless charging, the tablet computer or the smart phone is generally attached on the seat in such a manner that a side thereof with a coil for electromagnetic induction provided therein is attached onto the operating surface 102 of the seat, in order that the seat can carry an entire weight of the tablet computer or the smart phone. Thus, in order that the coil for electromagnetic induction in the tablet computer or the smart phone captures magnetic flux at a relatively great varying rate, it is desired that the coil in the seat is provided as close to the operating surface 102 as possible. As shown in FIG. 5, the coil 105 may be provided on a side of the first side portion 106 close to the operating surface 102, close to a position where the tablet computer or the smart phone is to be attached onto the operating surface 102.

Figure 6:
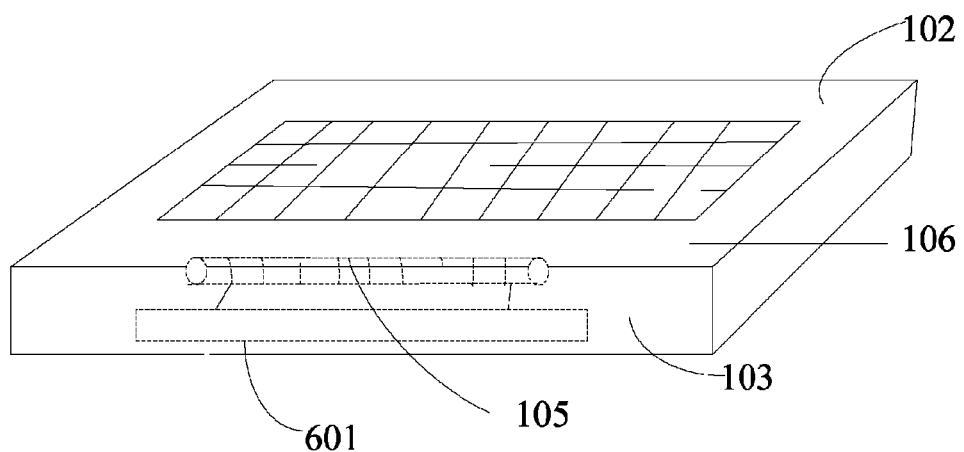
FIG. 6 is a schematic view showing connections of a coil for electromagnetic induction in an electronic device according to an embodiment of the present disclosure.

Further reference may be made to FIG. 6. FIG. 6 is a schematic view showing connections of the coil in the electronic device according to an embodiment of the present disclosure. If the operating surface is a front surface on which the input device is provided, the electronic device may further comprise an alternating power supply 601 connected to the coil 105 so that the coil can generate a varying magnetic field, as shown in FIG. 6. The alternating power supply 601 may be configured to supply an alternating current to the coil 105 so that the coil 105 can induce and generate a varying magnetic field.

Finally, how to attach the electronic device to charge it will be explained.

Likewise, descriptions will be given with respect to a case where the electronic device is a tablet computer or a smart phone and a case where the electronic device is a seat for use with electronic devices such as tablet computers and smart phones, respectively.

In the case where the electronic device is a tablet computer or a smart phone, the electronic device may further comprise a first attaching mechanism provided on a surface of the first side portion and configured to detachably attach the electronic device to a mating device for use with the electronic device in such a manner that the electronic device is rotatable with respect to the mating device.

In the case where the electronic device is a seat for use with electronic devices such as tablet computers and smart phones, the electronic device may further comprise a second attaching mechanism provided on a portion of the operating surface in the first side portion at a distance from the coil for electromagnetic induction less than a first preset value and configured to detachably attach the electronic device to a mating device for use with the electronic device in such a manner that the electronic device is rotatable with respect to the mating device.

As to specific configurations and attaching of the first and second attaching mechanisms, detailed descriptions will be provided in the following.

Embodiment 2

According to a further embodiment of the present disclosure, there is provided an electronic system, comprising, as a first body, an electronic device as described above where the operating surface comprises a surface on which the display unit is provided, and, as a second body, a further electronic device as described above where the operating surface comprises a surface on which the input device is provided. Specifically, the first body may comprise a tablet electronic device such as a tablet computer or a smart phone, and the second body may comprise a charging pad or an electronic device such as a seat for use with a tablet computer. However, the present disclosure is not limited thereto.

Figure 7:
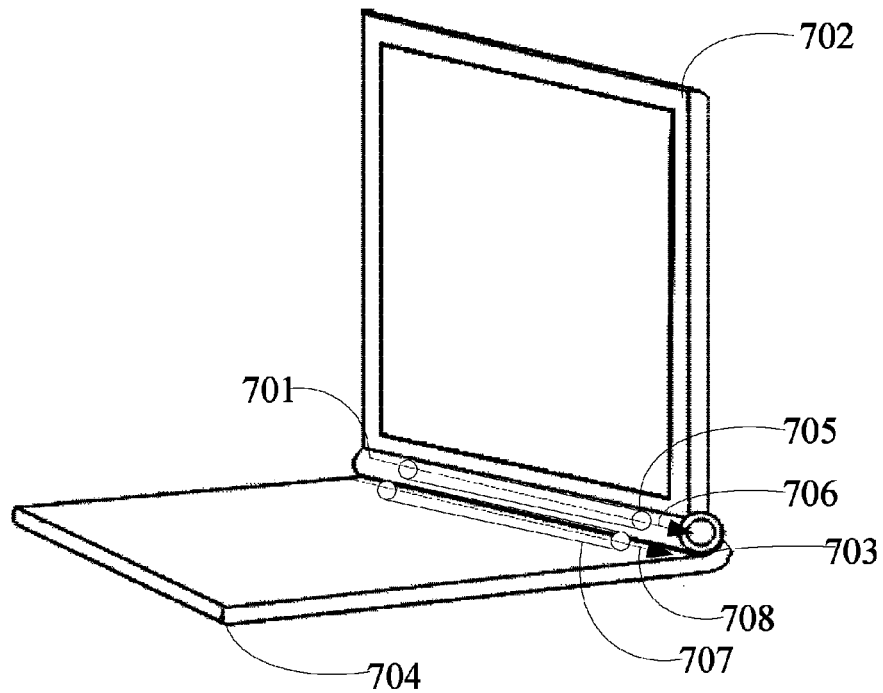
FIG. 7 is a schematic view showing a configuration of an electronic system according to an embodiment of the present disclosure.

FIG. 7 is a schematic view showing a configuration of an electronic system according to an embodiment of the present disclosure.

Referring to FIG. 7, the electronic system may comprise a first attaching mechanism 701 provided on a first body 702 and a second attaching mechanism 703 provided on a second body 704. The first attaching mechanism 701 and the second attaching mechanism 703 may be configured to detachably attach the first body 702 to the second body 704 in such a manner that the first body 702 is rotatable with respect to the second body 704 and that a first coil for electromagnetic induction 705 included in the first body 702 has a first axis 706 substantially parallel to a second axis 708 of a second coil for electromagnetic induction 707 included in the second body 704.

As described in the above, the first coil 705 and the first attaching mechanism 701 may be disposed on one same side of the first body 702, and the second coil 707 and the second attaching mechanism 703 may be disposed on one same side of the second body 704. As a result, when the first body 702 is detachably attached to the second body 704 by the first attaching mechanism 701 and the second attaching mechanism 703, a distance between the first coil 705 and the second coil 707 can be less than a preset value, so that the first coil 705 can be placed in a varying magnetic field generated by the second coil 707.

The first axis 706 of the first coil 705 can be disposed to be substantially parallel to the second axis 708 of the second coil 707 in the second body 704, so that the first coil 705 can capture magnetic flux at a relatively great varying rate from the second coil 707 while the distance between the first coil 705 and the second coil 707 keeps substantially the same.

The first attaching mechanism 701 and the second attaching mechanism 703 can be implemented in various manners to attach the first body 702 to the second body 704.

For example, the first attaching mechanism 701 may comprise an insertion block, and the second attaching mechanism 703 may comprise an insertion groove.

Figure 8:
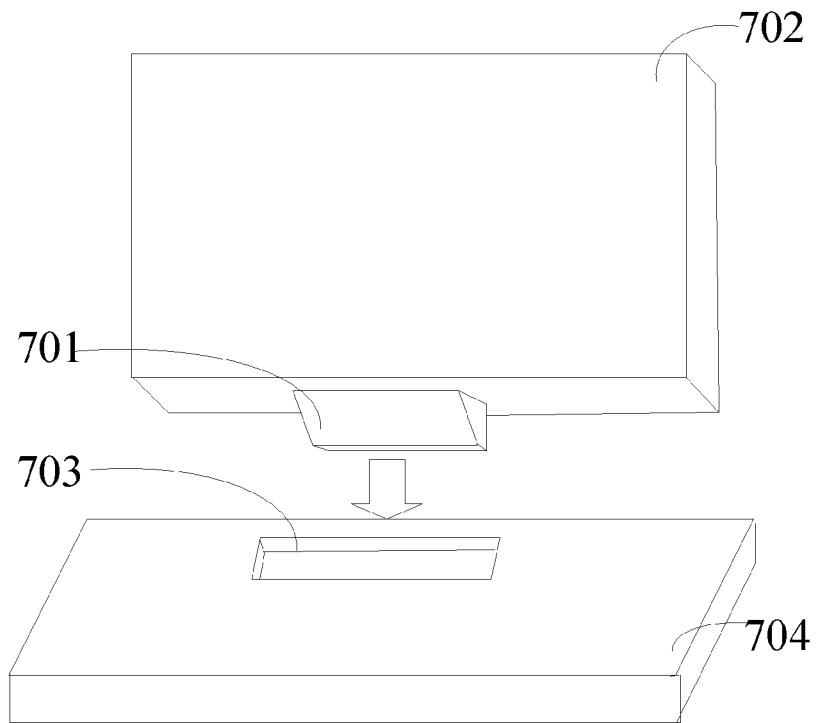
FIG. 8 is a schematic view showing a case where a first attaching mechanism comprises an insertion block and a second attaching mechanism comprises an insertion groove according to an embodiment of the present disclosure.

FIG. 8 is a schematic view showing a case where the first attaching mechanism comprises an insertion block and the second attaching mechanism comprises an insertion groove according to an embodiment of the present disclosure. As shown in FIG. 8, the first body 702 may be detachably attached onto the second body 704 by inserting the first attaching mechanism 701 in the form of insertion block into the second attaching mechanism 703 in the form of insertion groove.

Further, the first attaching mechanism 701 may comprise a holding end, and the second attaching mechanism 703 may comprise a receiving groove. The holding end is receivable in the receiving groove. The first body 702 and the second body 704 may have at least a first relative position and a second relative position different from the first relative position with respect to each other when the holding end is received in the receiving groove.

A distance between the second coil 707 and the receiving groove may be less than a second preset value and the first coil 705 may be provided inside the holding end, so that a distance between the first coil 705 and the second coil 707 can be less than a third preset value when the holding end is received in the receiving groove.

In the case where the first attaching mechanism 701 comprises a holding end and the second attaching mechanism 703 comprises a receiving groove, the electronic device may have various configurations.

Figure 9:
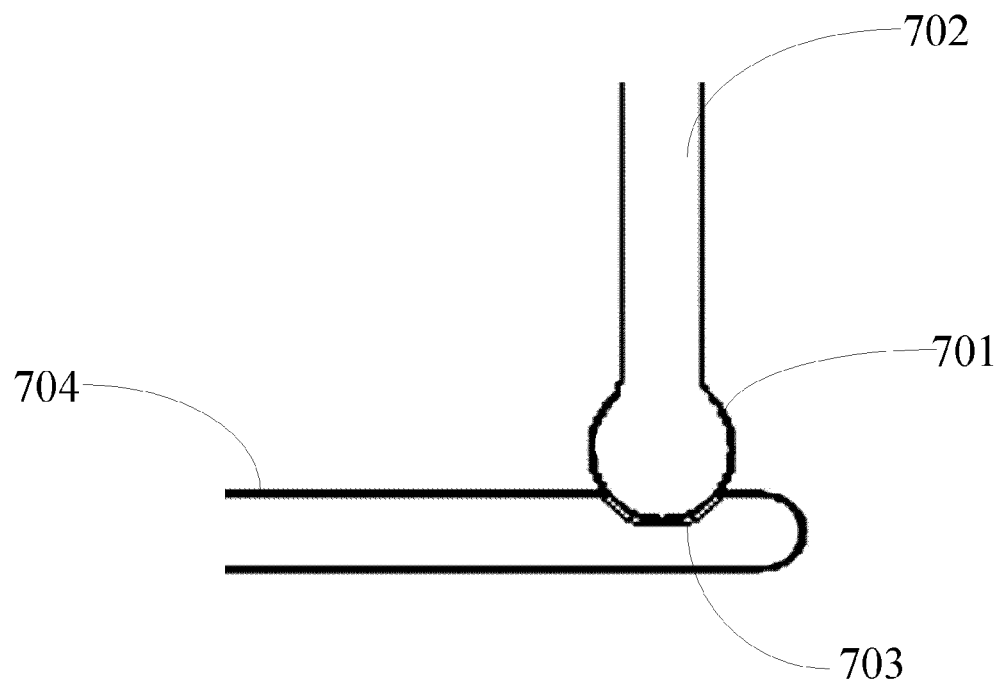
FIG. 9 is a schematic view showing that a first attaching mechanism comprises an arc-like holding end and a second attaching mechanism comprises an arc-like receiving groove.

One of the configurations is shown in FIG. 9. FIG. 9 is a schematic view showing that the first attaching mechanism comprises an arc-like holding end and the second attaching mechanism comprises an arc-like receiving groove. As shown in FIG. 9, the first attaching mechanism 701 has an outer surface, i.e., the first end surface 103, which is a smoothly curved surface and matches a bottom surface of the receiving groove of the second attaching mechanism 703. The first body 702 is rotatable with respect to the second body 704. When the first body 702 is being rotated from a first relative position to a second relative position with respect to the second body 704, any portion of the outer surface of the first attaching mechanism 701 is rotating with respect to the bottom surface of the receiving groove of the second attaching mechanism 703. That is, the outer surface of the first attaching mechanism 701 completely matches the bottom surface of the receiving groove of the second attaching mechanism 703. In other words, in a state where the first body 702 and the second body 704 are connected together and stand still with respect to each other, the first attaching mechanism 701 is engaged with the second attaching mechanism 703. For convenience of rotation of the first body 702 with respect to the second body 704, the outer surfaces of the first attaching mechanism 701 and the second attaching mechanism 703 are both smoothly curved surfaces, and preferably, those having matching curvatures.

Further, when the first body 702 is rotated from the first relative position to the second relative position with respect to the second body 704 under a first force, the first body 702 keeps being connected with the second body 704. If the first force is absent during the rotation of the first body 702 from the first relative position to the second relative position with respect to the second body 704 under the first force, then the first body 702 may keep still at a third angle with respect to the second body 704. The third angle may be any angle between the first relative position and the second relative position.

Further, a first magnetic member may be provide inside or on a surface of the first attaching mechanism 701, and a second magnetic member may be provided inside or on a surface of the second attaching mechanism 703. The first body 702 may be detachably attached to the second body 704 due to attraction between the first magnetic member and the second magnetic member. Further, if the first force is absent during the rotation of the first body 702 from the first relative position to the second relative position with respect to the second body 704 under the first force, then the first body 702 may keep still at the third angle with respect to the second body 704 due to the attraction between the first magnetic member and the second magnetic member and also a friction force between the outer surface of the first attaching mechanism 701 and the outer surface of the second attaching mechanism 703.

Preferably, the receiving groove of the second attaching mechanism 703 may have its bottom surface made from a material with a relatively large friction coefficient, such as rubber, silica gel, and the like.

Figure 10A:
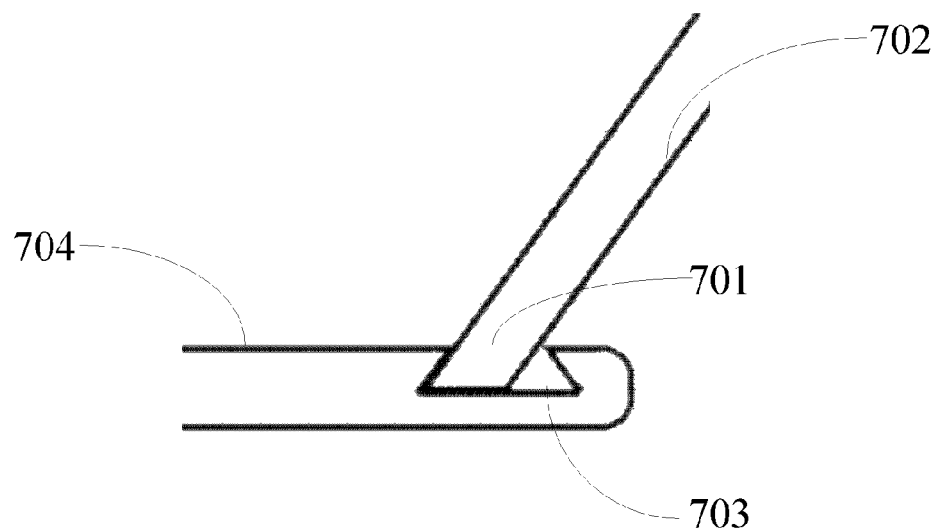
FIG. 10A is a schematic view showing that a first attaching mechanism comprises a polygonal holding end and a second attaching mechanism comprises a polygonal receiving groove according to an embodiment of the present disclosure.
Figure 10B:
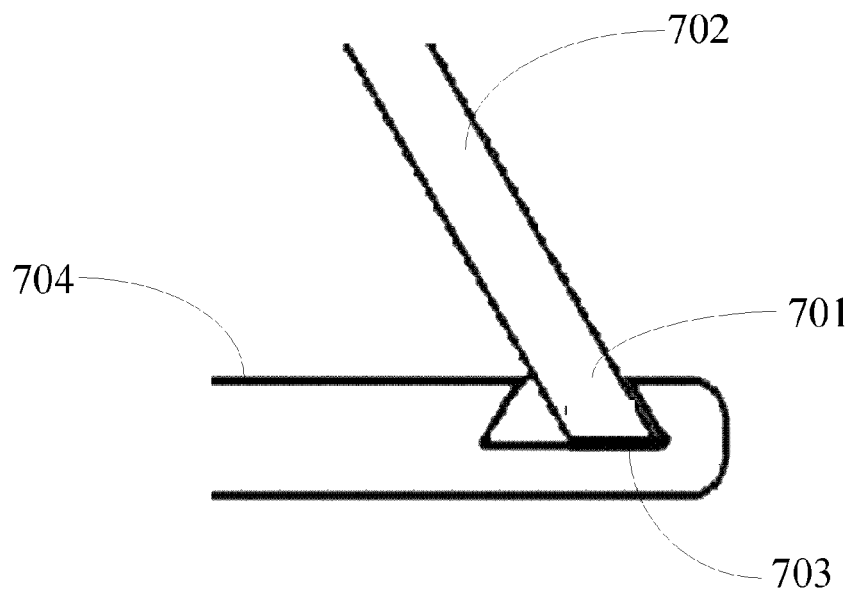
FIG. 10B is a schematic view showing that a first attaching mechanism comprises a polygonal holding end and a second attaching mechanism comprises a polygonal receiving groove according to a further embodiment of the present disclosure.

Another configuration is shown in FIGS. 10A and 10B. FIGS. 10A and 10B are schematic views showing that the first attaching mechanism comprises a polygonal holding end and the second attaching mechanism comprises a polygonal receiving groove. The first attaching mechanism 701 comprises a polygonal holding end, which can be clipped to the receiving groove of the second attaching mechanism 703. The first body 702 may be inserted into the receiving groove of the second attaching mechanism 703 with its front surface or back surface face outward, so that the first body 702 and the second body 704 are positioned in a first relative position as shown in FIG. 10A or a second relative position as shown in FIG. 10B.

It is apparent that the first attaching mechanism 701 and the second attaching mechanism 703 are not limited to the above configurations. It suffices that the first attaching mechanism 701 and the second attaching mechanism 703 can be detachably attached to each other.

According to an embodiment, the second body 704 may further comprise a positioning mechanism connected to the second attaching mechanism 703. The positioning mechanism may be configured to output a connection signal when the first body 702 is attached to the second body 704 so that an alternating power supply included in the second body 704 supplies power to the second coil 707 based on the connection signal, and to output a disconnection signal when the first body 702 is detached from the second body 704 so that the alternating power supply stops supplying power to the second coil 707 based on the disconnection signal.

Specifically, by providing the positioning mechanism connected to the second attaching mechanism 703 in the second body 704, the alternating power supply can supply power to the second coil 707 in the second body 704 only if the first body 702 is attached to the second body 704. As a result, it is possible to save energy.

According to an embodiment, the electronic system may further comprises a first communication unit provided in the first body at a distance from the first attaching mechanism less than a fourth preset value, and a second communication unit provided in the second body at a distance from the second attaching mechanism less than a fifth preset value. The first communication unit and the second communication may be configured to transmit and receive data therebetween for wireless data communication between the first body and the second body.

Embodiment 3

According to a further embodiment of the present disclosure, there is provided a wireless charging method for an electronic system as described above.

Figure 11:
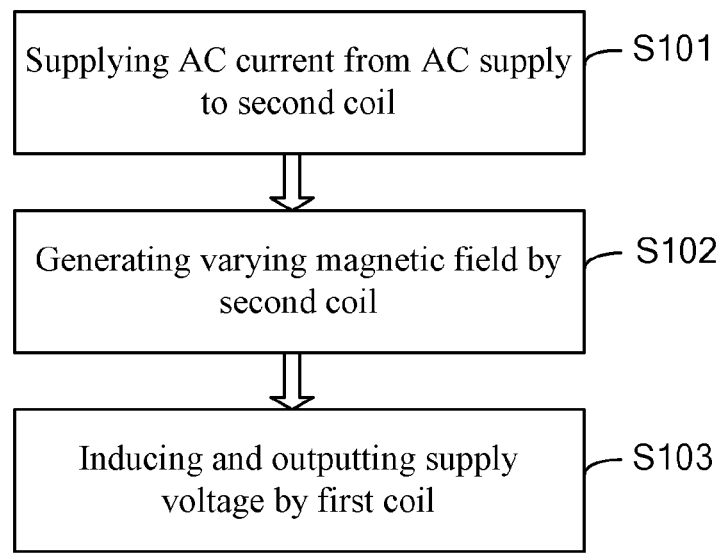
FIG. 11 is a flowchart schematically showing a wireless charging method according to an embodiment of the present disclosure.

FIG. 11 is a flowchart schematically showing a wireless charging method according to an embodiment of the present disclosure.

Referring to FIG. 11, the method may comprise operation S101 of supplying an alternating current by an alternating power supply in the second body to the second coil, operation S102 of generating a varying magnetic field by the second coil based on the alternating current, and operation S103 of inducing and outputting a supply voltage by the first coil based on the varying magnetic field in a state where the first body is attached to the second body, to charge an energy storage unit included in the first body.

The method may be embodied by the electronic system as described above. The above descriptions, especially those in Embodiment 2, also apply here. Thus, detailed descriptions of implementations of the method are omitted here.

According to embodiments of the present disclosure, there can be various effects or advantages.

The coil for electromagnetic induction can be provided in the first side portion of the housing close to the first end surface, which is not a surface of the housing with a maximal area. In other words, the coil for electromagnetic induction can be provided in the side portion of the electronic device close to the end surface with a relatively small area. As a result, if only the first side portion of the electronic device close to the end surface with a relatively small area is put into a varying magnetic field, the coil for electromagnetic induction in the first side portion can induce a supply voltage. Therefore, it is possible to eliminate the need of putting a tablet electronic device with its front or back surface against a charging pad to achieve wireless charging of the electronic device, and to provide a novel electronic device which can be charged in a wireless manner if only a first side portion thereof, close to an end surface with a relatively small area, is put into a varying magnetic field.

The coil for electromagnetic induction may comprise a columnar core and a winding wound around a side surface of the core. The winding may be wound for at least 2 turns in an axial direction. It is possible to reduce the cross section of the coil in its maximal area while ensuring a total number of turns of the winding by increasing the number of turns of the winding wound in the axial direction. As a result, even if the electronic device is an ultra-thin device, the coil can provided in the electronic device in such a manner that its axis is substantially parallel to the operating surface.

In a state where the first body is detachably attached to the second body by the first attaching mechanism and the second attaching mechanism, the axis of the first coil in the first body may be substantially parallel to the axis of the second coil in the second body, so that the first coil can capture the magnetic flux at a relatively great varying rate to induce a relatively great supply voltage based on the varying magnetic field.

By providing the positioning mechanism connected to the second attaching mechanism in the second body, the alternating power supply can supply power to the second coil in the second body only if the first body is attached to the second body. As a result, it is possible to save energy.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. An electronic device, comprising:
a housing, including an operating surface on which a display unit or an input device is provided and a first end surface adjoining the operating surface at a first edge, wherein the operating surface has an area greater than that of the first end surface; and
a coil for electromagnetic induction, provided in a first side portion of the housing close to the first end surface, and formed in a columnar shape with an axis substantially parallel to the first edge.

2. The electronic device according to claim 1, wherein the area of the operating surface is greater than or equal to an area of any surface of the housing other than the operating surface.

3. The electronic device according to claim 1, wherein the coil for electromagnetic induction comprises a columnar core and a winding wound around a side surface of the columnar core, wherein the winding is wound for at least 2 turns in a direction of the axis.

4. The electronic device according to claim 1, wherein the operating surface comprises a surface on which the display unit is provided, and the electronic device further comprises:
an energy storage unit provided in the housing, wherein the coil for electromagnetic induction is configured to induce and output a supply voltage under a varying magnetic field to charge the energy storage unit.

5. The electronic device according to claim 4, further comprising a regulator circuit connected between the coil for electromagnetic induction and the energy storage unit and configured to regulate the supply voltage from the coil for electromagnetic induction to output a regulated voltage to charge the energy storage unit.

6. The electronic device according to claim 4, further comprising a first attaching mechanism provided on a surface of the first side portion and configured to detachably attach the electronic device to a mating device for use with the electronic device in such a manner that the electronic device is rotatable with respect to the mating device.

7. The electronic device according to claim 1, wherein the operating surface comprises a surface on which the input device is provided, and the electronic device further comprises:
an alternating power supply connected to the coil for electromagnetic induction,
wherein the alternating power supply is configured to supply an alternating current to the coil for electromagnetic induction so that the coil for electromagnetic induction induces and generates a varying magnetic field.

8. The electronic device according to claim 7, wherein the coil for electromagnetic induction is provided on a side of the first side portion close to the operating surface.

9. The electronic device according to claim 7, further comprising a second attaching mechanism provided on a portion of the operating surface in the first side portion at a distance from the coil for electromagnetic induction less than a first preset value and configured to detachably attach the electronic device to a mating device for use with the electronic device in such a manner that the electronic device is rotatable with respect to the mating device.

10. An electronic system, comprising:
a first electronic device, comprising:
a first housing, including an operating surface on which a display unit or an input device is provided and a first end surface adjoining the operating surface at a first edge, wherein the operating surface has an area greater than that of the first end surface, and
a first coil for electromagnetic induction, provided in a first side portion of the first housing close to the first end surface and formed in a columnar shape with a first axis substantially parallel to the first edge;
a second electronic device, comprising:
a second housing, including an operating surface of the second housing on which a display unit or an input device is provided and a first end surface of the second housing adjoining the operating surface of the second housing at a first edge of the second housing, wherein the operating surface of the second housing has an area greater than that of the first end surface of the second housing;
a second coil for electromagnetic induction, provided in a first side portion of the second housing close to the first end surface of the second housing, and formed in a columnar shape with a second axis substantially parallel to the first edge of the second housing;
a first attaching mechanism provided on the first electronic device; and a second attaching mechanism provided on the second electronic device, wherein the first attaching mechanism and the second attaching mechanism are configured to detachably attach the first electronic device to the second electronic device in such a manner that the first electronic device is rotatable with respect to the second electronic device and that the first axis is substantially parallel to the second axis.

11. The electronic system according to claim 10, wherein the second electronic device further comprises:

a positioning mechanism connected to the second attaching mechanism, wherein the positioning mechanism is configured to output a connection signal when the first electronic device is attached to the second electronic device so that an alternating power supply included in the second electronic device supplies power to the second coil based on the connection signal, and to output a disconnection signal when the first electronic device is detached from the second electronic device so that the alternating power supply stops supplying power to the second coil based on the disconnection signal.

12. The electronic system according to claim 10, wherein the second attaching mechanism comprises a receiving groove and the first attaching mechanism comprises a holding end receivable in the receiving groove, wherein the first electronic device and the second electronic device have at least a first relative position and a second relative position different from the first relative position with respect to each other when the holding end is received in the receiving groove.

13. The electronic system according to claim 12, wherein a distance between the second coil and the receiving groove is less than a second preset value and the first coil is provided inside the holding end, so that a distance between the first coil and the second coil is less than a third preset value when the holding end is received in the receiving groove.

14. The electronic system according to claim 10, further comprising:

a first communication unit provided in the first electronic device at a distance from the first attaching mechanism less than a fourth preset value; and a second communication unit provided in the second electronic device at a distance from the second attaching mechanism less than a fifth preset value, wherein the first communication unit and the second communication are configured to transmit and receive data therebetween for wireless data communication between the first electronic device and the second electronic device.

15. A wireless charging method for an electronic system according to claim 10, the method comprising:

supplying an alternating current by an alternating power supply in the second electronic device to the second coil;

generating a varying magnetic field by the second coil based on the alternating current; and inducing and outputting a supply voltage by the first coil based on the varying magnetic field in a state where the first electronic device is attached to the second electronic device, to charge an energy storage unit included in the first electronic device.

\* \* \* \* \*